US009190718B2

(12) United States Patent
DiNallo et al.

(10) Patent No.: US 9,190,718 B2
(45) Date of Patent: Nov. 17, 2015

(54) EFFICIENT FRONT END AND ANTENNA IMPLEMENTATION

(75) Inventors: Carlo DiNallo, Plantation, FL (US); Stani Licul, North Bethesda, MD (US); Jeremy Marks, Atlanta, GA (US)

(73) Assignee: MAXTENA, Rockville, MD (US)

( * ) Notice: Subject to any disclaimer, the term of this patent is extended or adjusted under 35 U.S.C. 154(b) by 823 days.

(21) Appl. No.: 13/103,084

(22) Filed: May 8, 2011

(65) Prior Publication Data

US 2013/0035044 A1 Feb. 7, 2013

Related U.S. Application Data

(60) Provisional application No. 61/332,761, filed on May 8, 2010.

(51) Int. Cl.

| | |
|---|---|
| ***H04B 1/38*** | (2015.01) |
| ***H01Q 1/36*** | (2006.01) |
| ***H01Q 11/08*** | (2006.01) |
| *H04M 1/00* | (2006.01) |

(52) U.S. Cl.
CPC . *H01Q 1/36* (2013.01); *H01Q 11/08* (2013.01)

(58) Field of Classification Search
CPC ........ H01Q 25/00; H01Q 11/08; H01Q 5/357
USPC ........................ 455/73, 562.1, 575.7; 343/895
See application file for complete search history.

(56) References Cited

U.S. PATENT DOCUMENTS

| | | | | |
|---|---|---|---|---|
| 6,473,467 | B1 * | 10/2002 | Wallace et al. | 375/267 |
| 7,663,544 | B2 * | 2/2010 | Thomas et al. | 342/361 |
| 2002/0154705 | A1 * | 10/2002 | Walton et al. | 375/267 |
| 2003/0125040 | A1 * | 7/2003 | Walton et al. | 455/454 |
| 2006/0022892 | A1 * | 2/2006 | O'Neill et al. | 343/895 |
| 2008/0174501 | A1 * | 7/2008 | Licul et al. | 343/703 |
| 2010/0225539 | A1 * | 9/2010 | Margomenos et al. | 342/373 |
| 2011/0195670 | A1 * | 8/2011 | Dakshinamurthy et al. | 455/73 |

* cited by examiner

*Primary Examiner* — Ayodeji Ayotunde
(74) *Attorney, Agent, or Firm* — Oblon, McClelland, Maier & Neustadt, L.L.P.

(57) ABSTRACT

A tightly integrated combined transmit and receive dual quadrifilar antenna is provided. The antenna comprises four helical transmit elements and four helical receive elements disposed about a common axis. A receiver front end includes an arrangement of two 90 degree hybrids which serve to effectively reject signals cross coupled from the transmit elements back into the receive elements, while still allowing the receiver to receive signals.

21 Claims, 10 Drawing Sheets

*FIG. 1*
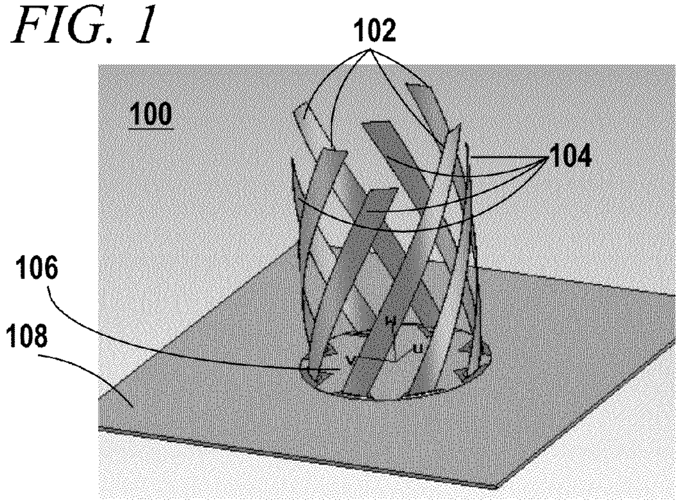
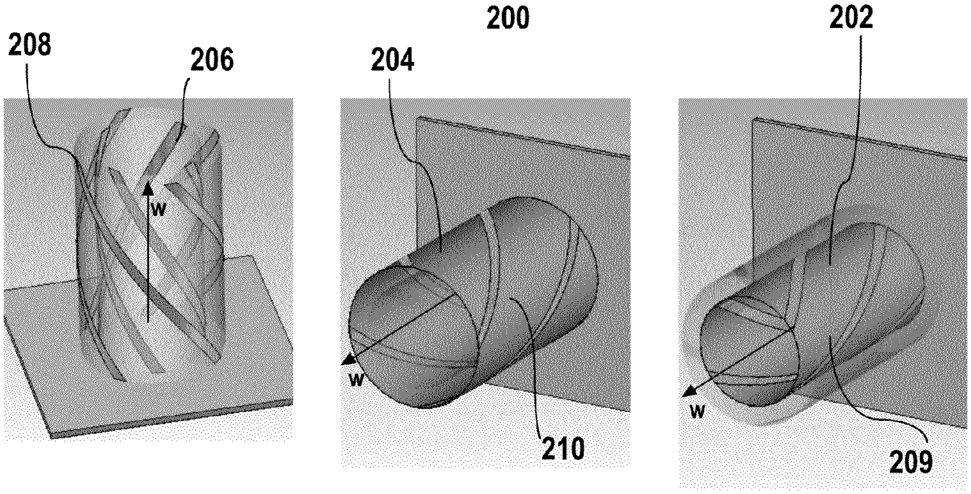
*FIG. 2A* *FIG. 2B* *FIG. 2C*

FIG. 4
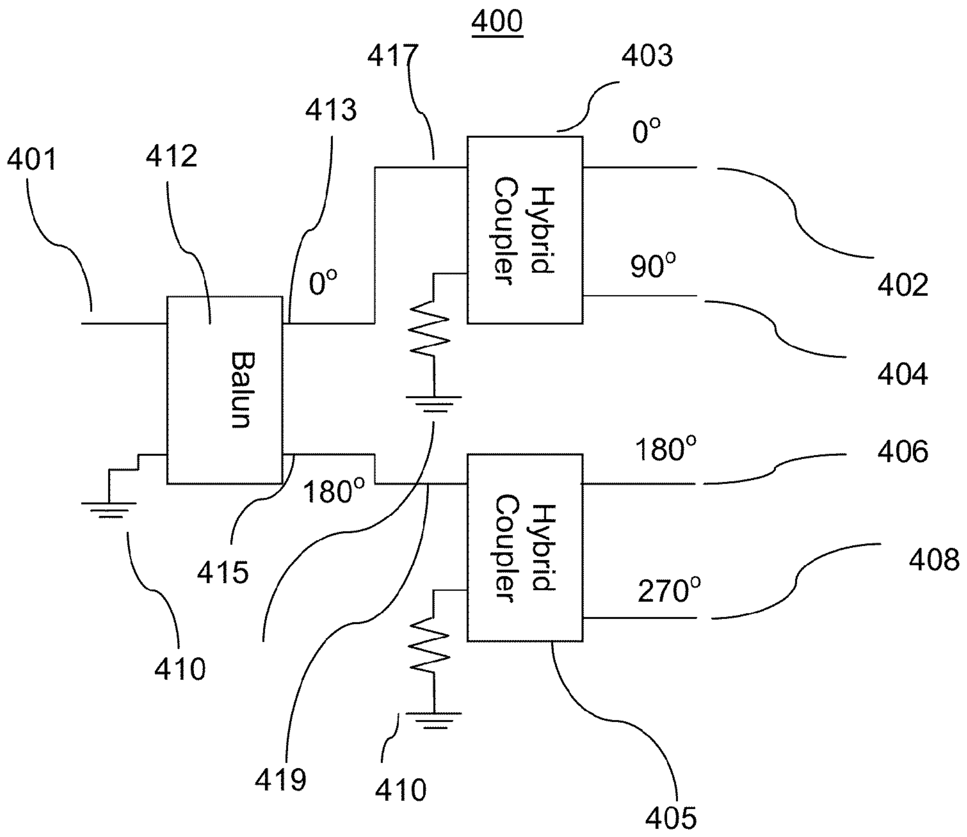
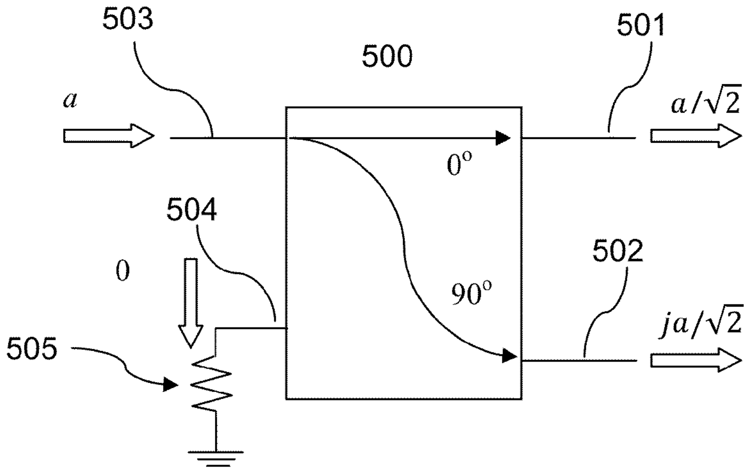
FIG. 5

FIG. 6
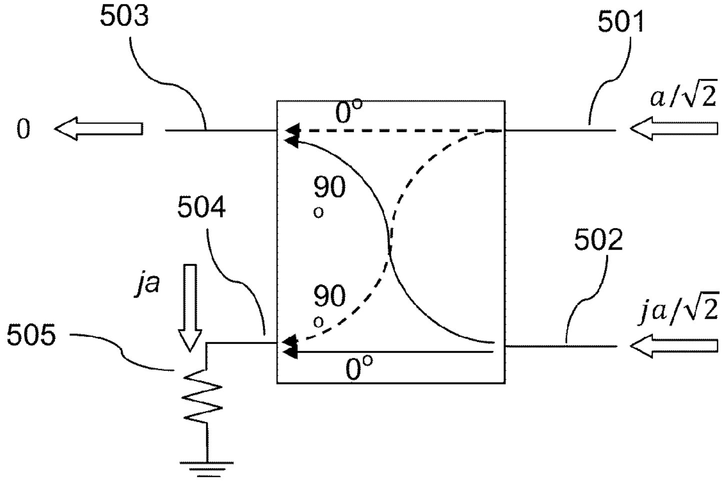
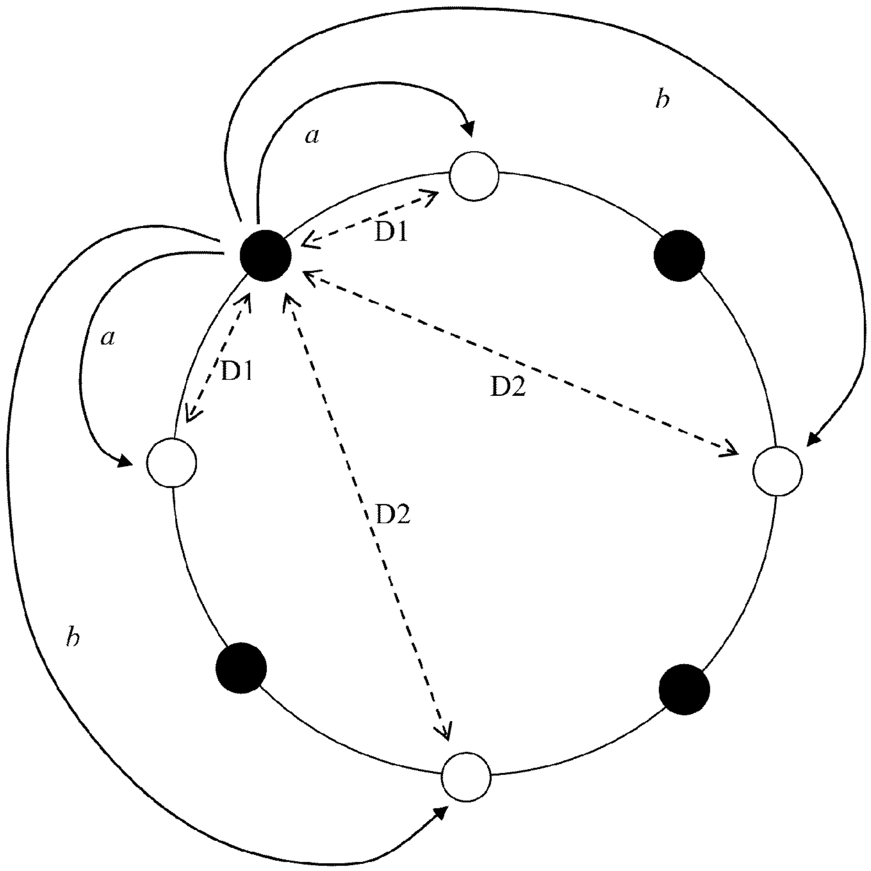
FIG. 7

*PRIOR ART*

EFFICIENT FRONT END AND ANTENNA IMPLEMENTATION

RELATED APPLICATION DATA

This application claims the benefit of U.S. provisional application No. 61/332,761 filed May 8, 2010.

FIELD OF THE INVENTION

The present invention relates to the field of antennas and transceiver architecture for satellite and mobile communications.

DESCRIPTION OF RELATED ART

In every two-way communication device the transmit (Tx) and receive (Rx) operations have to be properly isolated to avoid self interference. This separation, termed duplexing, is accomplished in many different ways such as for example by allocating different time slots for receiving and transmitting or by using two different frequency bands. In most wireless systems the duplexing function is performed by the transceiver front end and the Tx and Rx ports are combined and connected to a single antenna. This is by far the most commonly used architecture.

Alternatively, two separate antennas can be used, but this solution requires additional volume and does not necessarily provide the minimum required isolation. Isolation between Tx and Rx antennas can be obtained by designing antenna structures exciting orthogonal electromagnetic fields. However, building orthogonal antennas usually proves to be difficult and it is rarely done in practical systems. Moreover, orthogonal structures generate orthogonal polarizations and radiation patterns. This is not acceptable in many cases as the Tx and Rx antennas are required to have similar polarization and pattern characteristics. In satellite communications, for instance, the antennas need to have similar gain in the same direction.

A fractional-turn Quadrifilar Helix Antenna (QHA) disclosed in US Patent Application Publication 2008/0174501 A1 assigned in common with the present invention. Its pattern is nearly hemispherical and can be shaped to favor a particular elevation angle, if needed. Circular polarization is almost ideal over a very wide range of elevation angle. The most compact variant of the QHA has four helical elements with electrical length of about ¼ wavelength fed by a 4-port phase shifting network enforcing the proper phase rotation. A QHA is shown in FIG. 13. A detailed description of the possible implementation of the feeding network can be found in US 2008/0174501.

What is needed is an antenna system that is capable of simultaneously transmitting and receiving without having the transmitted signal overwhelm received signals and that exhibits substantially equal radiation patterns for both transmitting and receiving.

DESCRIPTION OF THE FIGURES

The present invention will be described by way of exemplary embodiments, but not limitations, illustrated in the accompanying drawings in which like references denote similar elements, and in which:

FIG. 1 is a schematic illustration of an antenna according to a first embodiment of the invention;

FIGS. 2A, 2B, 2C illustrate an antenna according to a second embodiment of the invention;

FIG. 4 is a schematic illustration of a feed network that is used to feed quadrifilar antennas according to certain embodiments of the invention;

FIG. 5 describes the operation of a 90 degree hybrid when fed with a signal at a common input port;

FIG. 6 describes the operation of a 90 degree hybrid when 2 signals of equal amplitude and in phase quadrature are fed to the 2 output ports;

FIG. 7 describes the spatial relationship between receiving and transmitting elements in one embodiment of the invention and illustrates the effect of the geometrical symmetry of the arrangement shown on the intercoupling between the elements;

DETAILED DESCRIPTION OF THE PREFERRED EMBODIMENTS

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The present invention provides an integrated dual Transmit/Receive quadrifilar antenna, applicable to any communication system using separate transmit and receive frequency bands. A system that uses the antenna to achieve transceiver duplexing is also disclosed. The antennas exhibit a substantially equal radiation patterns for transmitting and receiving functions. Isolation between transmission and reception channels connected to the antenna is achieved through phase cancellation in the antennas feeding network. A differential transceiver architecture that is particularly convenient when used in combination with the antenna is also disclosed.

The basic embodiment of the invention encompasses two quadrifilar helices having the same or different diameter. Each of the quadrifilar helices comprises four helical antenna elements. The two quadrifilar helices are tuned to different frequencies, corresponding to the centers of the Tx and Rx bands respectively and are spatially rotated 45 degrees with respect to each other.

Figure 13:
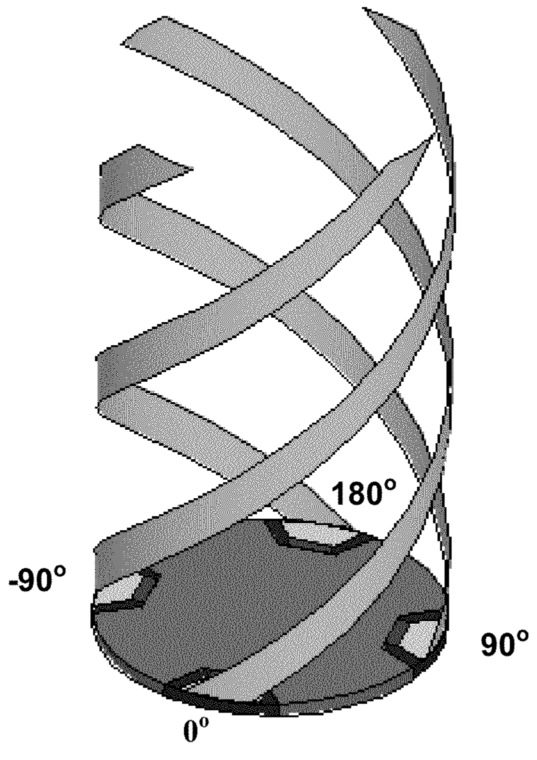
FIG. 13 shows a single quadrifilar antenna and indicates the phasing of a 4 port feeding network for the antenna.

According to the present invention antennas are provided that include two co-located quadrifilar helices. The two quadrifilar helices are used to perform the Tx and Rx duplexing function of the transceiver. For reference a cylindrical quadrifilar antenna is shown in FIG. 13, with the relevant phase impressed at each element by the feeding network. While a cylindrical shape is shown, the present invention applies to quadrifilar structures of any shape, such as conical or spherical.

According to embodiments of the invention the two quadrifilar helices are tuned at different frequencies corresponding to the Tx and Rx band of the communication system. The two quadrafilar helices share the same axis of symmetry (e.g., axis 'w' in FIG. 1) and can have the same radius or be placed one inside the other one.

FIG. 1 is a schematic illustration of an antenna 100 according to a first embodiment of the invention. The antenna 100 includes two quadrifilar helices located about a common axis, 'w' on a common surface. A first quadrifilar helix is made up of four helical transmit elements 102. A second quadrifilar helix is made up of four helical receive elements 104. The four receive elements 104 are shorter than the four transmit helical elements 102 and are thus tuned to a higher frequency of operation. Alternatively the frequency relationships of the transmit and receive elements may be reversed. The four receive elements 104 are equally spaced in azimuth angle about the axis 'w'. The four transmit elements 102 are also equally spaced in azimuth angle about the axis 'w'. The helical transmit elements 102 and the helical receive elements 104 alternate in position when proceeding azimuthally about the axis of symmetry, 'w' of the antenna 100. Each receive element 102 is preferably equally spaced from its two neighboring transmit elements 104 and vis-a-versa.

The surface on which the elements 102, 104 are disposed may be a virtual (e.g., mathematically defined) surface in the case that the helices are self-supporting. Alternatively the surface is the real surface of a dielectric (e.g., plastic, ceramic) support that supports the helices. In FIG. 1 no real surface is shown-the surface is virtual. The surface may for example be cylindrical, hemispherical, or frusto conical. A ground reference structure 106 for the antenna 100 takes the form of a ground plane of a printed circuit board 108 on which the antenna 100 is supported.

FIGS. 2A, 2B, 2C illustrate an antenna 200 according to a second embodiment of the invention. The antenna 200 includes an inner quadrifilar helix 202 nested within an outer quadrifilar helix 204. The inner and outer quadrifilar helices 202, 204 are coaxial, sharing a common axis 'w'. The inner quadrifilar helix 202 comprises four helical transmit elements 206 and the outer quadrifilar helix 204 comprises four helical receive elements 208. The four helical transmit elements 206 are disposed on an inner cylindrical surface 209 and the four helical receive elements 208 are disposed on an outer cylindrical surface 210 that is coaxial with the inner cylindrical surface 209 sharing the common axis 'w'.

In the antenna 200 the helical elements 206, 208 can have the same or different height because the difference in diameter between the inner and outer quadrifilar helices 202, 204 introduces a difference in the frequency tuning. However, it is convenient to make the inner quadrifilar helix 202 operate in a higher frequency band, and make the outer quadrifilar helix 204, with its larger diameter, operate in a lower frequency band.

Figure 3:
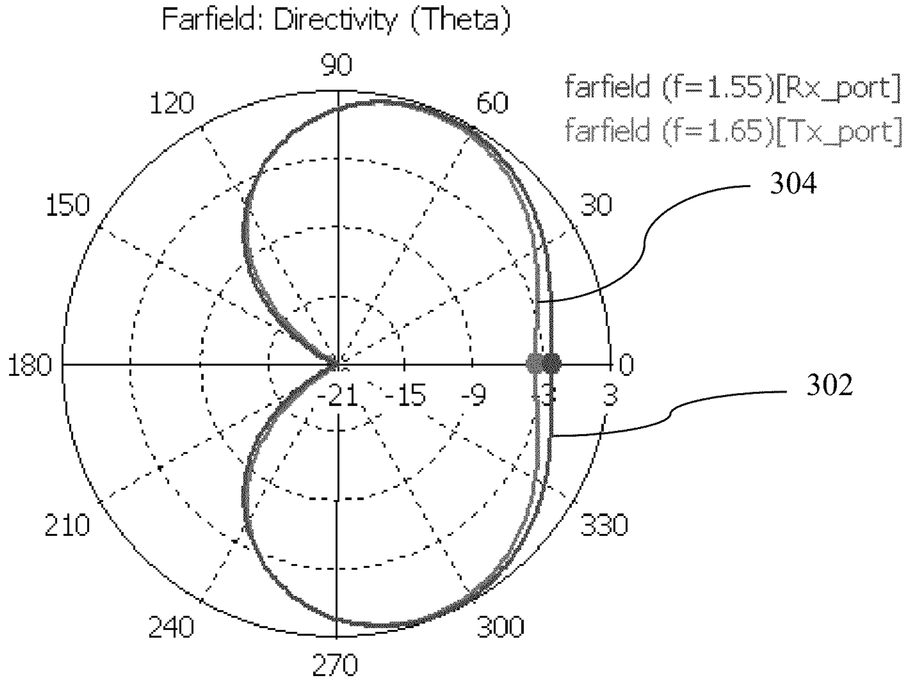
FIG. 3 is a plot showing the radiation patterns (in a vertical plane) for the antenna shown in FIG. 1.

FIG. 3 is a graph of the radiation pattern in a vertical plane for an embodiment of the type shown in FIG. 1. The curve 302 is the gain (in a plane containing the axis of symmetry, 'w' of the antenna) for the lower band antenna and while curve 304 represents the gain for the higher band antenna. The radiation characteristics are very similar and both are circularly polarized.

In quadrifilar antenna systems the helical antenna elements are fed through a 4-port phase shifting network enforcing the proper phase rotation. Usually the phase rotation is the same for both the Tx and Rx antennas. According to embodiments of the invention 90 degrees hybrid couplers are used to enforce the phase shifting.

FIG. 4 is a schematic illustration of a feed network 400 that is used in combination with dual quadrifilar antennas described above with reference to FIG. 1 and FIG. 2 according to embodiments of the invention. The same feed network 400 is useful for both the receive quadrifilar helices and the transmit quadrifilar helices, although in each case a different arrangement of amplifiers is used. Referring to the FIG. 4 an unbalanced terminal 401 of a balun 412 serves as a connection to other receiver or transmitter circuits (not shown) such as for example modulators or demodulators. The balun 412 also comprises a ground terminal coupled to a system ground 410 with respect to which the unbalanced terminal 401 is driven. The balun 412 further comprises a 0° balanced-side port 413 and a 180° balanced-side port 415. The 0° balanced-side port 413 is coupled to an input port 417 of a first 90° hybrid 403 and the 180° balanced-side port 415 is coupled to an input port 419 of a second 90° hybrid 405. The 90° hybrids 403, 405 also comprise ground terminals coupled to the system ground 410. The first 90° hybrid 403 includes a second port 402 phased at 0° and a third port 404 phased at 90°. The second 90° hybrid includes a second port 406 and a third port 408. Because the input port 419 of the second 90° hybrid 405 is coupled to the 180° balanced-side port 415 of the balun 412, the second port 406 is phased at 180° and the third port 408 is phased at 270°. Thus considering the second ports 402, 406 and third ports 404, 408 of the 90° hybrids 403, 405 it is seen that four phases of the signal appearing at unbalanced terminal 401 will be present at the these ports 402, 406, 404, 408. The signals appearing at ports 402, 404, 406, 408 are spaced apart by 90°. The ports 402, 404, 406, 408 with respective phases 0°, 90°, 180°, 270°, will be coupled to four elements of a quadrifilar helix such that phase increases in uniform steps of 90° when proceeding in a predetermined azimuth direction (i.e., CW or CCW) from one helical antenna element to a succeeding helical antenna element. FIGS. 5 and 6 illustrates the operation of a 90° hybrid 500 which is equivalent to the 90° hybrids 403, 405 shown in FIG. 4. The 90° hybrid 500 has two quadrature ports 501, 502 for coupling to antenna elements, one input port 503 and one isolated port 504 which is terminated with an resistive load 505 which is usually a 50 Ohm load. When a signal is fed to the input port 503, as illustrated in FIG. 5, the signal is split equally between the 2 quadrature ports 501, 502, with, for instance, +90° phase difference between them. No signal is coupled in theory to the isolated port 504. However, if two signals of equal amplitude are applied to the quadrature ports 501, 502 with the same relative phase difference of 90 degrees, as exemplified in FIG. 6, all the power is transferred to the isolated port 504 and absorbed by the resistive load 505.

The feed network 400 is suitably implemented on a Printed Circuit Board (PCB) that also includes the ground reference structure (e.g., ground plane) for the antennas. A simple and effective implementation of the design is obtained by placing Tx and Rx phase shifting networks on the top and bottom layer of the PCB respectively. The ground plane is suitably embodied in a middle layer placed between the top and bottom layers of the PCB.

In general the out of band rejection of an antenna is not enough to provide the required Tx/Rx isolation. In practical communication systems the Tx and Rx bands are relatively close to each other in frequency. The frequency separation only provides 10 to 15 dB isolation between the Tx and Rx antenna. Such isolation is too poor for the system to work properly. A more realistic isolation value in practical system is 40-50 dB.

FIG. 7 illustrates how additional isolation is obtained by using the embodiments of the invention. Transmit elements are represented by black dots and receive elements are represented by unfilled circles. Because of the rotational symmetry of the structure it can be recognized that each transmitting element is at an equal shorter distance D1 from two of the receiving elements and at an equal larger distance D2 from the other two receiving elements. It can be demonstrated that the amount of power coupled by a single transmitting element into each receiving element is the same if the distance is the same as depicted in FIG. 7, where a indicates the signal coupled to the closer elements and b the signal coupled to the farther elements. Since each transmitting element is fed with the same amplitude s and known phase, it is possible to calculate the summed signal coupled by all the transmitting elements to each individual receiving element.

Figure 8:
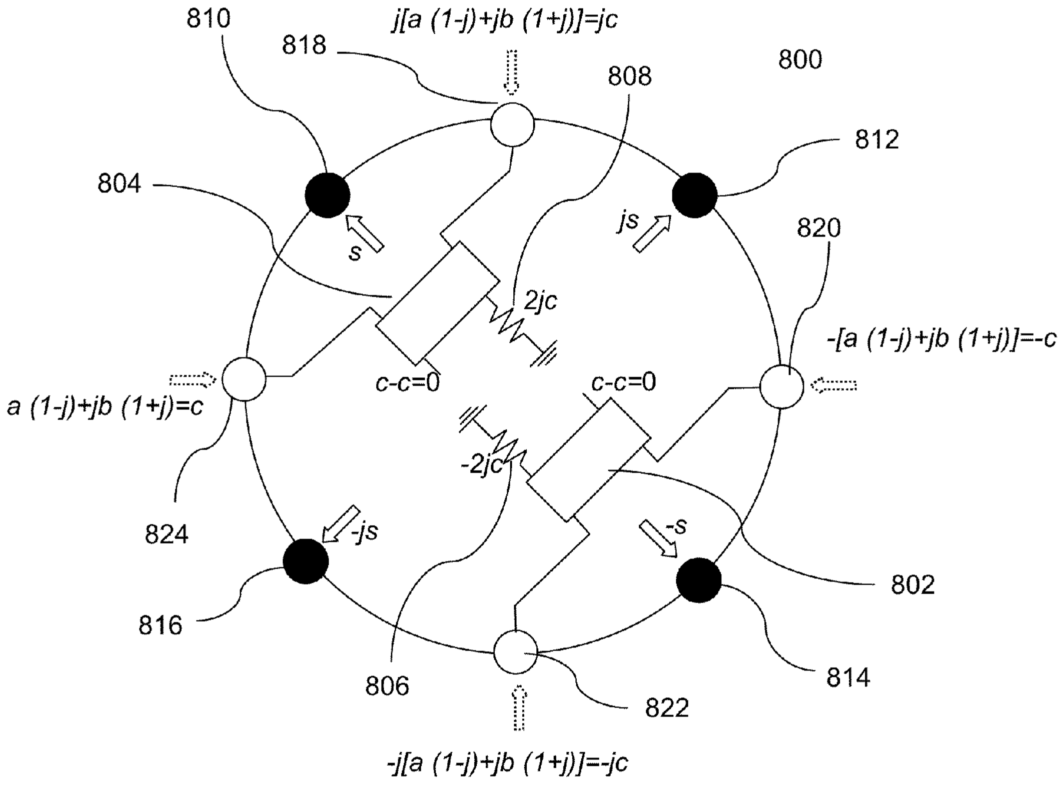
FIG. 8 illustrates a phase cancellation effect that is achieved in embodiments of the invention, and that provides for very good isolation between the transmitted and received signals.

FIG. 8 is a schematic plan view of an antenna system 800 highlighting the manner in which signals cross coupled from a set of transmit antenna elements 810, 812, 814, 816 into a set of receive antenna elements 818, 820, 822, 824 are effectively rejected by a receiver front end. The antenna system 800 includes (proceeding in clockwise order from the upper left) a first transmit antenna element 810, a first receive antenna element 818, a second transmit antenna element 812, a second receive antenna element 820, a third transmit antenna element 814, a third receive antenna element 822 a fourth transmit antenna element 816 and a fourth receive antenna element 824. The aforementioned antenna elements are equally spaced in azimuth angle. Mathematical expressions adjacent to each particular receive antenna element give the sum of signals cross-coupled to the particular receive antenna element from the transmit antenna elements. Signals coupled from the transmit antenna elements to the receive antenna elements are combined into the 90 degrees hybrid couplers 802 and 804 as indicated in FIG. 8. The result is a complete cancellation of the signal coupled from the transmit antenna element to into the receive antenna elements at the hybrids input ports 503 (FIG. 5, 6) and an in phase combination of the coupled signals at the isolated port 504 (FIG. 5, 6). Since the isolated ports 504 are connected to a 50 ohm loads 806, 808, the signal coupled from the transmit antenna elements to the receive antenna elements is suppressed and does not affect the receiver chain (e.g., demodulator, decoder, not shown).

Figure 9:
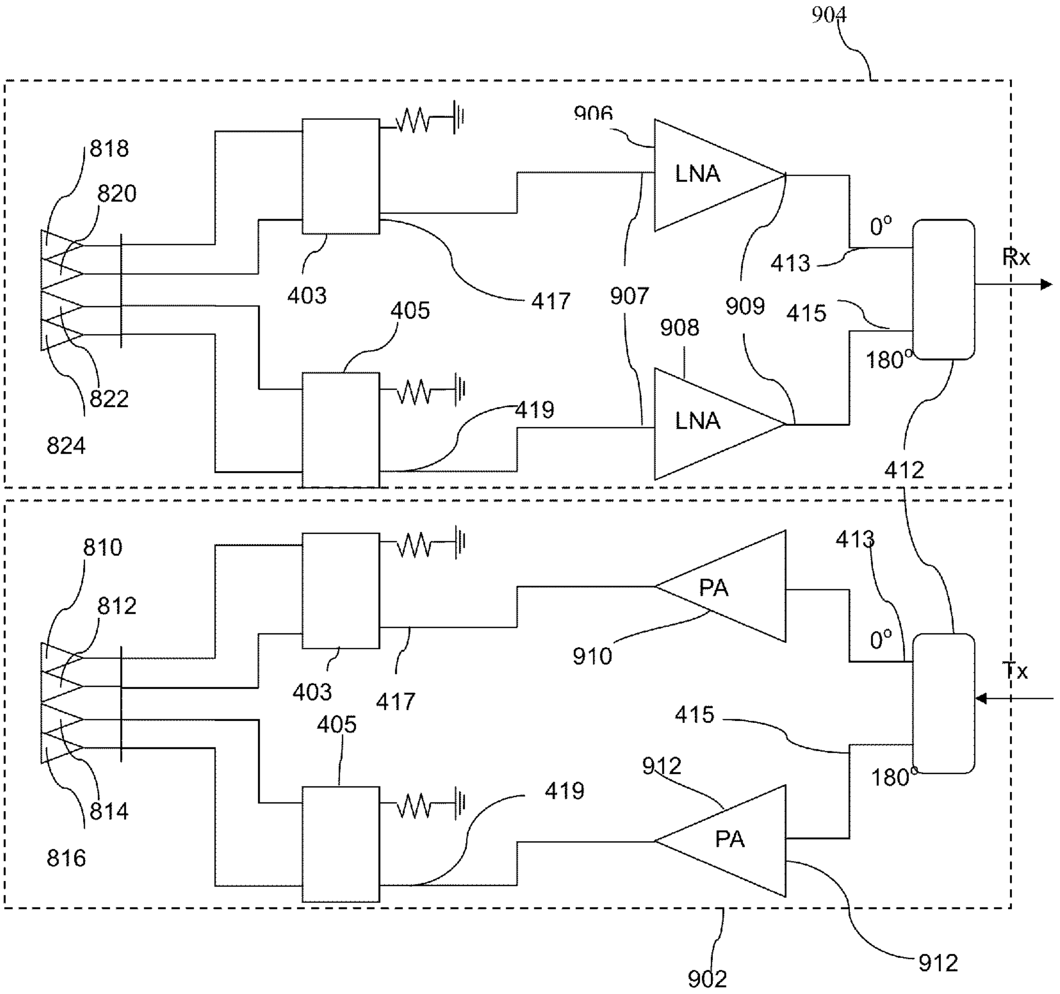
FIG. 9 is a schematic illustration of a transceiver front end, used in combination with the antennas shown in FIG. 1 and FIG. 2 and variations thereof according to embodiments of the invention.

FIG. 9 is a schematic illustration of a transceiver front end 900, used in combination with the antennas shown in FIG. 1 and FIG. 2 and variations thereof according to embodiments of the invention. The transceiver front end 900 comprises a transmitter front end 902 and a receiver front end 904. The architecture of both of the transmitter front end 902 and receiver front end 904 conform to the schematic shown in FIG. 4 excepting the addition of a pair of Low Noise Amplifiers (LNA) 906, 908 in the receiver front end 904 and a pair of Power Amplifiers (PA) 910, 912 in the transmitter front end 902.

In the receiver front end 904, two inputs 907 of the two LNAs 906, 908 are connected to the 'input' (serving here as outputs) ports 417, 419 of the receiver 90° hydrids 403, 405, forming the feeding network of a receiving antenna (e.g., 100, 200). Two outputs 909 of the two LNAs 906, 908 are coupled to 0° and 180° balanced side ports 413, 415 of the balun 412. The LNAs 906, 908 are driven by signals in phase opposition and the total received signal can be combined after amplification through the use of the balun 412. Alternatively a single differential LNA can be used in lieu of the two LNAs 906, 908.

Figure 10:
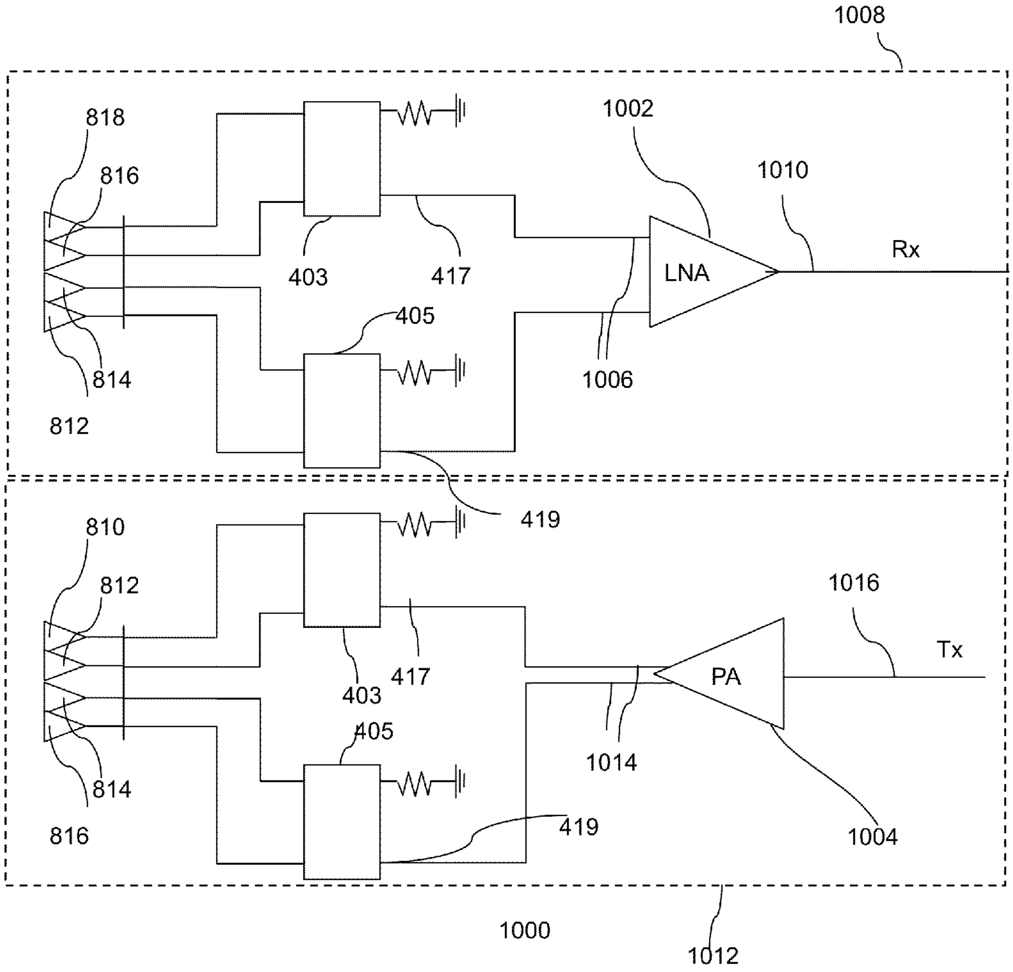
FIG. 10 is an schematic illustration of a transceiver front end, that uses differential amplifiers and that can be used in combination with the antennas shown in FIG. 1 and FIG. 2 and variations thereof according to embodiments of the invention.

In the transmitter front end 902 a first PA 910 is interposed between the 0° balanced-side port 413 of the balun 412 and the input port 417 of a first 90° hybrid 403; and a second PA 912 is interposed between the 180° balanced-side port 415 of the balun 412 and the input port 419 of a second 90° hybrid 405. Differential phasing is obtained by using the balun 412 to split the Tx signal. Alternatively a single differential PA can be used. According to certain embodiments the functions of the balun 412 may be embodied in a frequency filter component FIG. 10 is a schematic illustration of a transceiver front end 1000 that uses differential amplifiers 1002, 1004 in lieu of the amplifiers 906,908, 910, 912 used in the embodiment shown in FIG. 9. The function of the balun in this embodiment is integrated in the differential amplifiers 1002, 1004 and baluns 412 are no longer needed. A differential input low noise amplifier 1002 includes a pair of inputs 1006 that are coupled to the inputs (here serving as an output) 417, 419 of the first and second 90° hybrids of a receiver part 1008 of the transceiver front end 1000. An output 1010 of the differential input low noise amplifier 1002 serves as an output of the receiver 1008.

In a transmitter part 1012 of the transceiver front end 1000 a differential output PA 1004 includes a pair of differential outputs 1014 that are coupled to inputs 417, 419 of the first and second 90° hybrids of the transmitter part 1012. An input 1016 of the differential output PA 1004 serves as an input of the transmitter part 1012.

Figure 11:
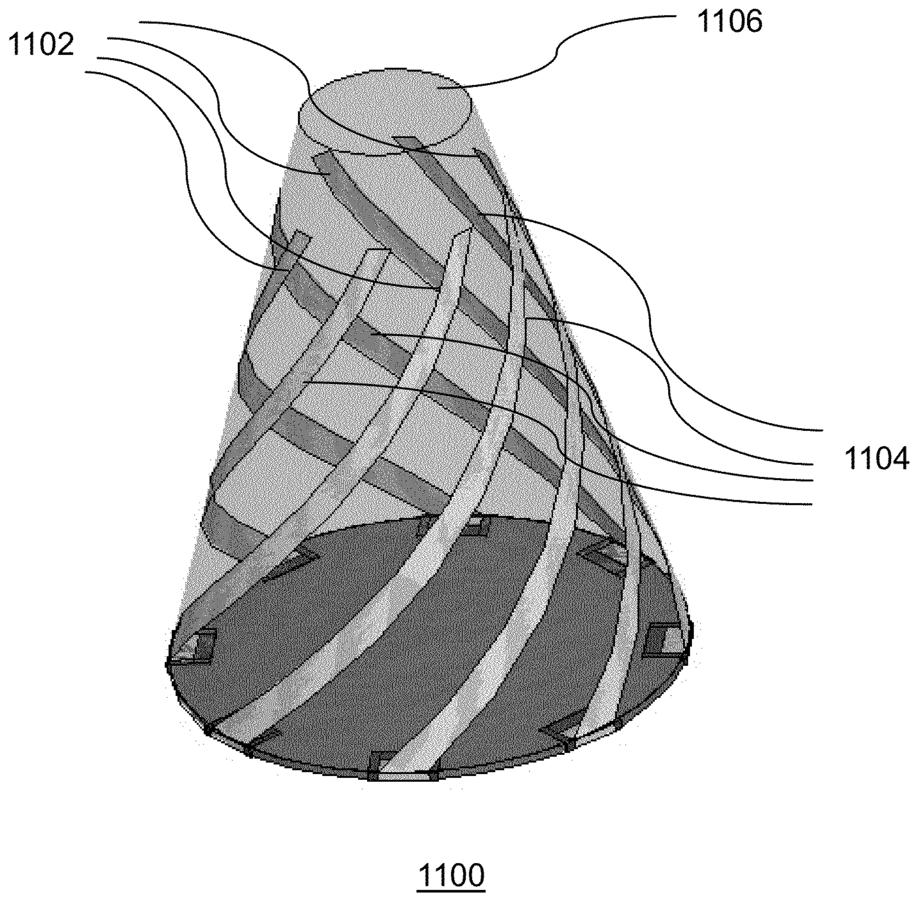
FIG. 11 is a schematic illustration of an antenna that includes four helical transmit elements and four helical receive elements arranged on a conical surface according to an embodiment of the invention.

FIG. 11 shows an antenna 1100 according to an embodiment of the present invention. The antenna 1100 includes four transmit elements 1102 and four receive elements 1104 arranged on a frusto conical surface 1106.

Figure 12:
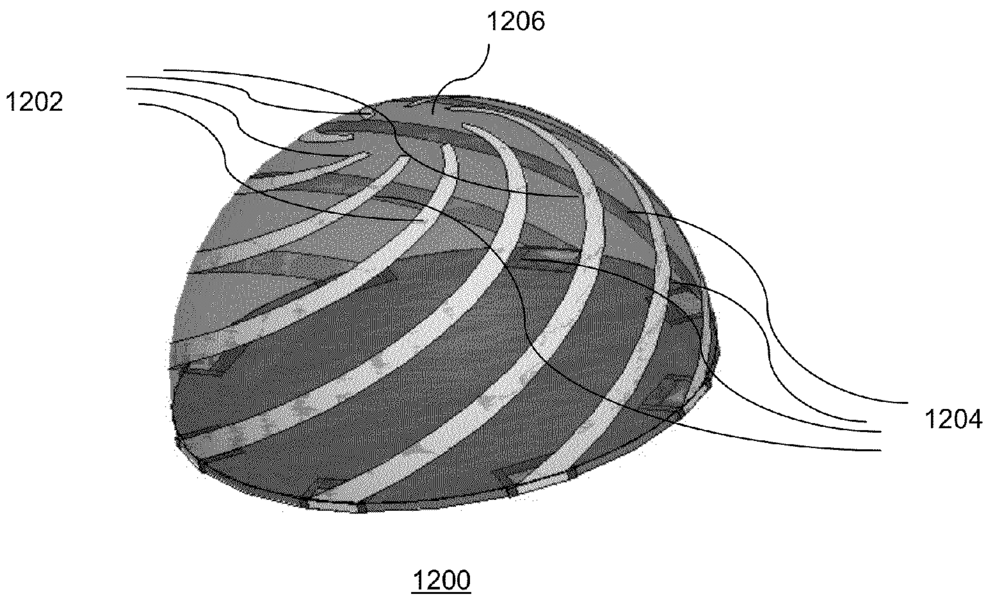
FIG. 12 is a schematic illustration of an antenna that includes four helical receive elements and four helical transmit elements conforming to a hemispherical surface according to an embodiment of the invention.

FIG. 12 shows an antenna 1200 according to an embodiment of the present invention. The antenna 1200 includes four transmit elements 1202 and four receive elements 1204 conforming to a hemispherical surface 1206.

The antenna systems described above provide advantages in terms of filtering, linearity, power handling capacity and noise suppression. Moreover the cancellation of signals cross coupled from the transmit elements to the receive elements that is obtained in such antenna systems provides an additional 3 dB to Tx/Rx isolation. The antenna systems described above can be use singly or in a phased array arrangement.

While particular embodiments of the invention has been described above with reference to the accompanying figures, various variations and modification of the invention are possible and will apparent to those of ordinary skill in the art, and the invention should not be construed as limited to the particular embodiments shown and described and should only be construed as limited by the appended claims.

We claim:

1. An antenna assembly comprising:

a set of four transmit antenna elements including a first transmit antenna element, a second transmit antenna element, a third transmit antenna element and a fourth transmit antenna element, wherein said set of four transmit elements are arranged in order about an axis and are equally spaced about said axis in azimuth angle;

a set of four receive antenna elements including a first receive antenna element, a second receive antenna element disposed adjacent said first receive element, a third receive antenna element disposed adjacent said second receive antenna element and a fourth receive antenna element disposed adjacent said third receive antenna element and said first receive antenna element, wherein said set of four receive antenna elements are arranged in order about said axis, equally spaced about said axis in azimuth angle;

a transmitter front end coupled to said set of four transmit elements;

a receiver front end coupled to said set of four receive elements.

2. The antenna assembly according to claim 1 wherein said transmitter front end is adapted to provide four signals to said set of four transmit antenna elements wherein, in proceeding from transmit antenna element to transmit antenna element azimuthally in a predetermined azimuth direction, each successive element receives a signal that has a phase that is advanced by 90 degrees relative to a signal applied to a preceding element.

3. The antenna assembly according to claim 2 wherein:

said receiver front end comprises a first 90 degree hybrid coupled to said first receive element and said second receive element and a second 90 degree hybrid coupled to said third receive element and said fourth receive element.

4. The antenna assembly according to claim 3 wherein said transmitter front end comprises a third 90 degree hybrid coupled to said first transmit element and said second transmit element and a fourth 90 degree hybrid coupled to said third transmit element and said fourth transmit element.

5. The antenna assembly according to claim 3 wherein:

said receiver front end further comprises a balun coupled to said first 90 degree hybrid and said second 90 degree hybrid.

6. The antenna assembly according to claim 5 further comprising:

a first low noise amplifier coupled between said first 90 degree hybrid and said balun;

a second low noise amplifier coupled between said second 90 degree hybrid and said balun.

7. The antenna assembly according to claim 3 wherein:

said receiver front end further comprises a differential input low noise amplifier coupled to said first 90 degree hybrid and said second 90 degree hybrid.

8. The antenna assembly according to claim 2 wherein said transmitter front end comprises a first 90 degree hybrid coupled to said first transmit element and said second transmit element and a second 90 degree hybrid coupled to said third transmit element and said fourth transmit element.

9. The antenna assembly according to claim 8 wherein:

said transmitter front end further comprises a balun coupled to said first 90 degree hybrid and said second 90 degree hybrid.

10. The antenna assembly according to claim 9 further comprising:

a first power amplifier coupled between said balun and said first 90 degree hybrid;

a second power amplifier coupled between said balun and said second 90 degree hybrid.

11. The antenna assembly according to claim 9 wherein:

said transmitter front end further comprises a differential output power amplifier coupled to said first 90 degree hybrid and said second 90 degree hybrid.

12. The antenna assembly according to claim 1 wherein each of said receive elements is equally spaced from two of said transmit elements.

13. The antenna assembly to claim 1 wherein said receive antenna elements and said transmit antenna elements are disposed on a common surface.

14. The antenna assembly according to claim 13 wherein said common surface is a cylindrical surface.

15. The antenna assembly according to claim 13 wherein said common surface is hemispherical.

16. The antenna assembly according to claim 13 wherein said common surface is frusto conical.

17. The antenna assembly according to claim 1 where said receive antenna elements are disposed on a first surface and said transmit antenna elements are disposed on a second surface that is coaxial with said first surface.

18. The antenna assembly according to claim 17 wherein said first surface is cylindrical and said second surface is cylindrical.

19. The antenna assembly according to claim 1 wherein said receive antenna elements and said transmit antenna elements are helical.

20. The antenna assembly according to claim 1 wherein a gain pattern of said set of four receive elements is substantially equal to a gain pattern of said set of four transmit elements.

21. The antenna assembly according to claim 1 wherein said receive elements are tuned to a first frequency and said transmit elements are tuned to a second frequency.

* * * * *